United States Patent [19]
Hahn et al.

[11] Patent Number: 6,062,491
[45] Date of Patent: May 16, 2000

[54] CLEANING DEVICE FOR A WINDOW/ HEADLAMP COVER OF A MOTOR VEHICLE

[75] Inventors: Torsten Hahn, Homberg; Willi Neumann, Bebra, both of Germany

[73] Assignee: Mannesmann VDO AG, Frankfurt, Germany

[21] Appl. No.: 09/173,592

[22] Filed: Oct. 15, 1998

[30] Foreign Application Priority Data

Oct. 20, 1997 [DE] Germany ............................ 197 46 275

[51] Int. Cl.[7] .................................. B05B 1/10; B60S 1/46
[52] U.S. Cl. ...................................... 239/284.2; 239/284.1
[58] Field of Search .............................. 239/284.1, 284.2, 239/255; 296/96.15; 15/250.001, 250.002

[56] References Cited

U.S. PATENT DOCUMENTS

| | | | |
|---|---|---|---|
| 3,199,787 | 8/1965 | Oishei et al. ........................ | 239/284.1 |
| 3,574,337 | 4/1971 | Edwards ............................... | 239/284.2 |
| 4,210,283 | 7/1980 | Stouffer et al. .................... | 239/284.1 X |
| 5,074,471 | 12/1991 | Baumgarten et al. ............... | 239/284.1 |
| 5,657,929 | 8/1997 | DeWitt et al. ....................... | 239/284.2 |

FOREIGN PATENT DOCUMENTS

| | | |
|---|---|---|
| 6804517 | 10/1968 | Germany . |
| 8105826 | 7/1982 | Germany . |
| 8431147 | 1/1985 | Germany . |
| 4230958 | 3/1994 | Germany . |

*Primary Examiner*—Lesley D. Morris
*Assistant Examiner*—Sean P. O'Hanlon
*Attorney, Agent, or Firm*—Martin A. Farber

[57] ABSTRACT

A cleaning device for a window/headlamp cover (5) of a motor vehicle has two washer nozzles (3, 4) which are manufactured as ajoint component (2) and in each case produce strip-shaped spraying regions (8, 9) on the window/ headlamp cover (5). The spraying regions (8, 9) are arranged one above the other and thus complement one another. This means that a large region of the window/headlamp cover (5) is wetted with washing fluid without washing fluid falling alongside the window/headlamp cover (5).

7 Claims, 2 Drawing Sheets

CLEANING DEVICE FOR A WINDOW/HEADLAMP COVER OF A MOTOR VEHICLE

FIELD AND BACKGROUND OF THE INVENTION

The invention relates to a cleaning device for a window/headlamp cover of a motor vehicle, having a washer nozzle which sprays washing fluid onto the window/headlamp cover.

Cleaning devices of this type are frequently used, for example, for vehicle headlamp lens covers, and are known from practice. In these cases, as large a region of the window/headlamp cover as possible is sprayed with washing fluid by the washer nozzle. If the washer nozzle is designed appropriately, it is possible for the window/headlamp cover to be cleaned without afterwiping just by the washing fluid being sprayed on.

The disadvantage of the known cleaning devices is that it is difficult to adapt the spraying region of the washer nozzle to the shape of the window/headlamp cover. For example, frictional losses within the washer nozzle frequently lead to the spraying region becoming restricted and hence to the corner regions of the window/headlamp cover being inadequately cleaned. Furthermore, during installation, the washer nozzle has to be aligned with respect to the window/headlamp cover in a complex procedure. This results in the cleaning device being installed manually in a very cost-intensive manner.

SUMMARY OF THE INVENTION

An object of the invention is to provide a cleaning device of the type mentioned at the beginning in such a manner that it wets as large a region of the window/headlamp cover as possible with washing fluid, and can be installed in a cost effective manner.

According to the invention, at least two washer nozzles are manufactured as a joint component and have spraying regions which each complement the other.

This arrangement enables the washer nozzles of the joint component to be configured as individual washer nozzles independently of one another to match intended spraying regions and spraying pressures, with the result that even asymmetrical window/headlamp covers are cleaned completely through addition of the spraying areas of appropriately designed washer nozzles. In addition, this can easily avoid the situation where washing fluid falls alongside the window/headlamp cover. Unlike in the known cleaning device, frictional losses within the washer nozzles of the cleaning device according to the invention result in only a slightly changed spraying region on the window/headlamp cover. The invention enables outlay on construction to be particularly low even if there are a multiplicity of washer nozzles in the joint component. The cleaning device according to the invention is therefore also suitable for windshields and rear windows of motor vehicles or for window/headlamp covers in which afterwiping is carried out by a wiper after the washing fluid has been sprayed on.

The cleaning device according to the invention enables a window/headlamp cover of large surface area to be cleaned without afterwiping if the joint component has a partition in a central region, and a respective washer nozzle designed as a fluidic chip is arranged on each side of the partition. Washer nozzles designed as a fluidic chip produce a washing fluid jet of particularly small cross section, which swings to and fro cyclically. Because the washing fluid jet swings to and fro, for example, a strip-shaped region of the window/headlamp cover can be wetted with washing fluid. The washing fluid jet in this case has a very high pressure and so dirt adhering to the window/headlamp cover is washed away. These washer nozzles have oval or strip-shaped spraying regions which can easily be added to form a large spraying region.

The supply of the washer nozzles with washing fluid is configured in a particularly simple manner if the partition has a recess for the overflow of washing fluid from one washer nozzle to the other washer nozzle.

According to another advantageous feature of the invention, the washer nozzles can be manufactured particularly cost-effectively if walls of a shaft which supports the joint component each form a boundary of a space for fluid in the washer nozzles. Particularly when the washer nozzles are designed as fluidic nozzles, this design results in a very simple construction since, to produce the washing fluid jet which swings to and fro, fluidic nozzles generally have a large space for fluid with block-shaped inserts. A component having two washer nozzles can thereby be produced, for example, in an axially releasable injection mold or sintering mold.

According to another advantageous development of the invention, the component which has the washer nozzles can be installed in a particularly simple manner if the joint component of the washer nozzles and the shaft are each of wedge-shaped design. This design enables the washer nozzles to be aligned in the shaft automatically during installation.

According to another advantageous development of the invention, the installation of the component which has the washer nozzles requires particularly low outlay in terms of time if in the region of the partition the joint component has protruding pegs, and a nozzle stem which supports the component has latching elements which engage around the pegs. In addition, installation can be automated.

BRIEF DESCRIPTION OF THE DRAWINGS

With the above and other objects in view, the present invention will become more clearly understood in connection with the detailed description of a preferred embodiment, when considered with the accompanying drawings of which.

BRIEF DESCRIPTION OF THE PREFERRED EMBODIMENT

Figure 1:
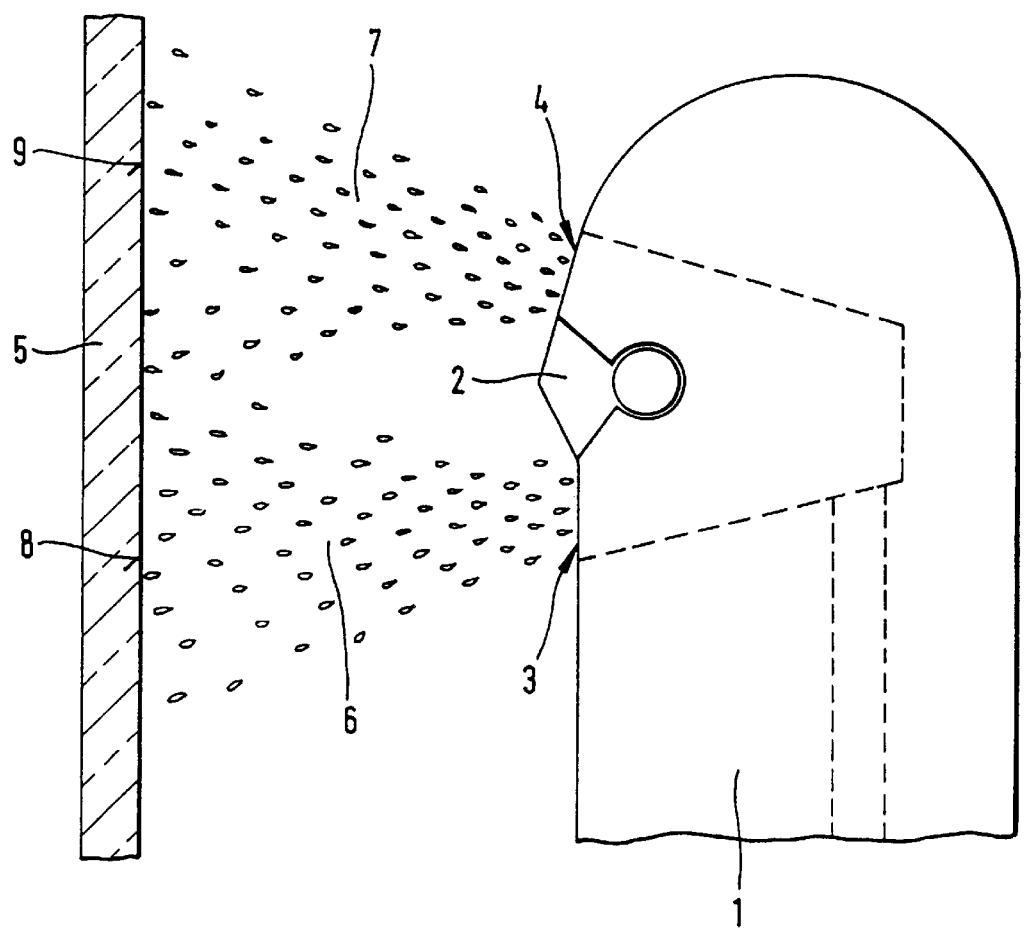
FIG. 1 shows washer nozzles which are arranged in front of a window/headlamp cover and have washing fluid jets.

FIG. 1 shows a component 2 which is fastened in a nozzle stem 1 and has two washer nozzles 3, 4. The nozzle stem 1 is directed with the washer nozzles 3, 4 onto a window/headlamp cover 5. The window/headlamp cover 5 may be, for example, a lens cover of a motor vehicle headlamp or a motor vehicle windshield or rear window. The washer nozzles 3, 4 are designed as fluidic nozzles and in each case produce a washing fluid jet 6, 7 of particularly small cross section which swings to and fro cyclically perpendicularly with respect to the plane of projections. The washer nozzles 3, 4 thereby respectively produce strip-shaped spraying regions 8, 9 on the window/headlamp cover 5, which spraying regions complement one another to form a large spraying region. At the same time, a negative pressure is produced between the washing fluid jets 6, 7 and this leads to the trajectory of individual washing fluid drops being bent toward the other washing fluid jet 8, 9 in each case. This causes that region of the window/headlamp cover 5 which lies between the spraying regions 8, 9 likewise to be wetted with washing fluid.

Figure 2:
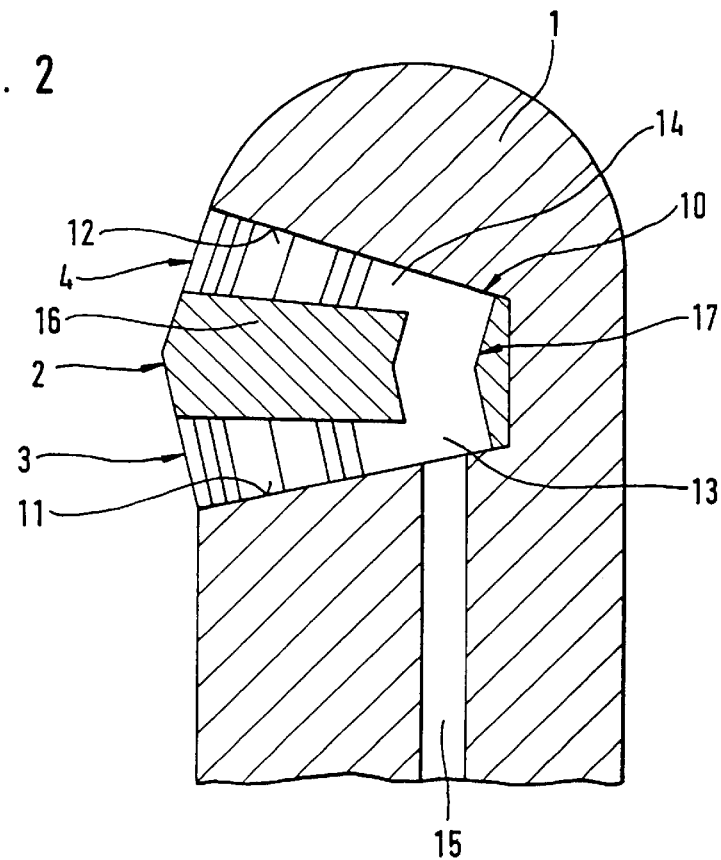
FIG. 2 shows the washer nozzles from FIG. 1 in a longitudinal section.

In a longitudinal section through the nozzle stem 1 and the joint component 2 of the washer nozzles 3, 4, FIG. 2 shows that the component 2 is of wedge-shaped design and is arranged in a similarly wedge-shaped shaft 10 of the nozzle stem 1. Walls 11, 12 of the shaft 10 in this case each bound a space 13, 14 for fluid in the washer nozzles 3, 4. The washer nozzles 3, 4 are supplied with washing fluid via a washing fluid duct 15 arranged in the nozzle stem 1. Between the washer nozzles 3, 4 there is arranged a partition 16 with a recess 17 via which washing fluid can overflow from the lower washer nozzle 3 to the upper washer nozzle 4. The upper and lower regions of the recess 17 are each arranged perpendicularly to those regions of the washer nozzles 3, 4 which bear against the shaft 10. As a result, the joint component 2 of the washer nozzles 3, 4 can be manufactured, for example, in an axially releasable injection mold or sintering mold.

Figure 3:
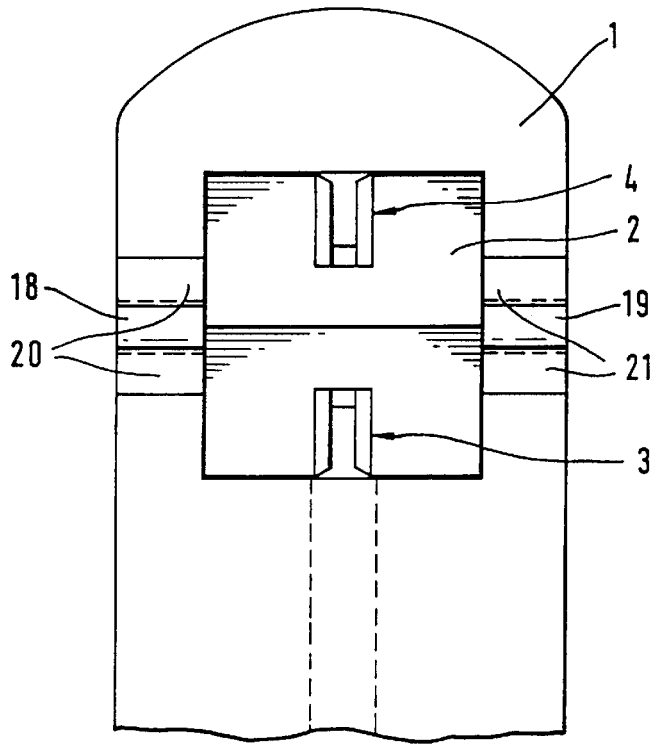
FIG. 3 shows a view of the washer nozzles from FIG. 1 from the window/headlamp cover.

In FIG. 3, the nozzle stem 1 and the joint component 2 of the washer nozzles 3, 4 from FIG. 1 are shown in a view from the window/headlamp cover 5. In this case it can be seen that the joint component 2 of the washer nozzles 3, 4 has laterally protruding pegs 18, 19 around which latching elements 20, 21 of the nozzle stem 1 engage.

We claim:

1. A cleaning device for spraying washing fluid onto a surface, including a windows and a headlamp cover, of a motor vehicle, comprising a joint component having at least two washer nozzles, and wherein said washer nozzles are formed to provide spraying regions which each complement the other.

2. The cleaning device as set forth in claim 1, wherein the joint component in a central region has a partition; and a respective of said washer nozzles is formed as a fluidic chip and is arranged on each side of the partition.

3. The cleaning device as set forth in claim 2, wherein the partition has a recess for overflow of washing fluid from one washer nozzle to the other washer nozzle.

4. The cleaning device as set forth in claim 2, further comprising a nozzle stem supporting the joint component;

wherein in the region of the partition the joint component has protruding pegs; and said nozzle stem has latching elements which engage around the pegs.

5. The cleaning device as set forth in claim 1, further comprising a shaft supporting said joint component;

wherein said shaft has walls forming a boundary of a space for fluid in the washer nozzles.

6. The cleaning device as set forth in claim 5, wherein the joint component and the shaft are each wedge-shaped.

7. A cleaning device for spraying washing fluid, comprising:

at least a first and a second washer nozzle disposed in a joint component for spraying complementary regions of a surface to be washed;

an elongated wedge located between fluid conduction passages of said respective first and second washer nozzles, said wedge defining an elongated configuration to each of said passages of said first and said second washer nozzles and providing a junction of said washer nozzle passages with a common source of the fluid located within said joint component;

wherein, said wedge permits independent continuous flows of the fluid from each of said washer nozzles.

* * * * *